United States Patent [19]

Schiffel et al.

[11] Patent Number: 5,533,030

[45] Date of Patent: Jul. 2, 1996

[54] RADIOTELEPHONE SYSTEM WITH THE CHARACTER OF A LOCAL OR AUXILIARY COMMUNICATIONS APPARATUS

[75] Inventors: Reinhard Schiffel; Klaus Jäckel; Bruno Stadler; Holger Vogel, all of Berlin, Germany

[73] Assignee: Jenoptik Communications GmbH, Jena, Germany

[21] Appl. No.: 244,007

[22] PCT Filed: Aug. 17, 1993

[86] PCT No.: PCT/DE93/00766

§ 371 Date: Sep. 12, 1994

§ 102(e) Date: Sep. 12, 1994

[87] PCT Pub. No.: WO94/17336

PCT Pub. Date: Mar. 31, 1994

[30] Foreign Application Priority Data

Aug. 21, 1992 [DE] Germany ............................ 42 27 990.9

[51] Int. Cl.⁶ .................................................... H04J 1/08
[52] U.S. Cl. ............................ 370/120; 370/122; 370/74
[58] Field of Search .............................. 370/69, 1, 122, 370/71, 73, 74, 76, 24, 30, 120, 70; 455/53.1, 3.2, 5.1, 6.1

[56] References Cited

U.S. PATENT DOCUMENTS 3,202,765  8/1965  Byrne ........................ 370/74
4,002,982  1/1977  Catania ...................... 370/74
4,288,868  9/1981  Grotjohann et al. ........ 370/30
4,528,656  7/1985  Morais ....................... 370/30

FOREIGN PATENT DOCUMENTS 2537683  6/1986  Germany.
3447107  6/1986  Germany.
3527331  2/1987  Germany.

Primary Examiner—Wellington Chin
Attorney, Agent, or Firm—Sprung Horn Kramer & Woods

[57] ABSTRACT

A transmission process with specific adaptive properties in an analog or mixed analog-digital transmission system, having a fixed base station and a number of subscriber station independent of one another. Information from the base station is transmitted to the subscriber stations wherein each information channel is converted by suppressed carrier, single-side band modulation to a narrow-band signal. The narrow-band signals are arranged spectrally adjacent one another in a frequency multiplex allocation scheme and are modulated on a carrier set at a higher frequency range using phase or frequency modulation. Each subscriber accesses no more than one of the information channels. Information transmissions from the subscriber stations to the base station is performed using narrow-band radio channels.

8 Claims, 2 Drawing Sheets

RADIOTELEPHONE SYSTEM WITH THE CHARACTER OF A LOCAL OR AUXILIARY COMMUNICATIONS APPARATUS

BACKGROUND OF THE INVENTION

I Field of the Invention

The present invention relates to a radio transmission system for communications between a fixed station and a number of fixed subscriber stations that operate independently of one another.

II Description of the Known Art

For information transmission in systems with a radial operating structure which are characterized by a local base station and a plurality of noninterdependent subscriber stations, wherein the transmission of information is performed each time from the base station to the individual subscriber stations and from the subscriber stations to the base station, different transmission processes are used.

It is characteristic of such systems that, as a rule, access by the individual subscriber stations is limited to no more than one of a great number of information channels at a time. These information channels are combined by multiplex processes. Code-multiplex, time-multiplex and frequency-multiplex processes are known.

In the code-multiplex process the information is modulated by base modulation on a carrier, and the resultant signal, which is a narrow-band signal in comparison to the channel bandwidth, is spread out spectrally to the channel bandwidth by multiplex modulation by means of a code word identifying the receiver.

The recognition of the signal is performed with the aid of the spectral coding. The message is selected in the receiver from among the plurality of spectrally coded messages superimposed in the code multiplex channel, with the aid of the code word associated with it.

In the time-multiplex process the entire bandwidth of a radio channel is available to each subscriber, which the latter may use only at definite, short time intervals. The characters or groups of characters identifying the different subscribers are contained one inside the other and are transmitted at a correspondingly higher bit rate in the single radio channel, while the time channel associated with each subscriber is repeated periodically with the length of the frame period.

Code-multiplex and time-multiplex processes are used preferentially for digital information transmission systems.

By their use virtually any signal-to-noise ratio can be achieved in exchange for a great transmission bandwidth.

The code- and time-multiplex processes require very efficient, and at present still expensive digital signal processing, especially in the subscriber stations, but also in the base station. In the time-multiplex process the necessary line synchronization is complicated, and, in the code-multiplex process especially, so is the code synchronization in the subscriber stations.

In the frequency-multiplex process the total bandwidth available for the transmission of information is divided up into narrow frequency bands which correspond each to one information transmission channel. Such a narrow frequency band is available to the subscriber throughout the radio transmission. Frequency-multiplex processes can be used to advantage in analog or combination digital-analog systems requiring only medium quality because an established cost-effective technology is available and only a relatively small transmission bandwidth is needed.

For the use of the above-described multiplex transmission processes in most of the systems of this kind known heretofore, especially radio transmission systems, the same processes have been used in both directions of information transmission, i.e., both from the base station to the subscriber stations and also in the opposite direction.

Such a system is described, for example, in the German patent specification DE-OS 2537683. The individual radio channels are operated as duplex channels in the lower and upper sideband with a given duplex separation, all channels being disposed in the frequency multiplex and are all at the same channel separation from one another.

Likewise, transmission processes of this kind are known from carrier frequency technology and from radio beam technology. In contrast to the systems herein considered, however, a point-to-point information transfer is performed between two fixed base stations, a relatively great number of information channels being always beamed in transmission.

German patent specification DE-OS 3447107 discloses a digital information transmission process for cellular networks, in which a different modulation process is used in each direction in the information transmission channel. For the transmission of information the mobile subscribers access one of a number of information channels.

In the direction from the fixed base station to the subscriber stations, each information channel is spread by spread spectrum modulation. The spread information channels are superimposed on one another and the broad-band sum signal thus obtained is transmitted in a common frequency band.

The transmission of information from the subscriber stations to the base station is performed in narrow-band frequency channels separate from one another.

Code multiplex is favored as a multiplex process and is combined with a binary spread modulation. This process has advantages especially in regard to security against interference in mobile radio networks. The spread modulation that is concretely to be used can be varied before transmission starts.

Various measures, such as the use of different kinds of spread modulation, different frequency bands, different time channels, limited channel numbers and channel frequencies serve for interference suppression between adjacent radio cells.

German patent specification DE-OS 3527331 discloses a transmission process which uses different combinations of multiplex processes in both directions of transmission of the digital radio system for the beamed transmission of information channels.

In the base station to subscriber station transmission the information to be sent is inserted into the channel using the combination of code-multiplex, time-multiplex and frequency-multiplex processes which is demultiplexed by the same process in the subscriber station.

Transmission from the subscriber stations to the base station is performed in narrow-band frequency channels separate from one another, or in time channels, or in code planes separate from one another, or combinations thereof.

When traffic is limited, beaming methods are proposed, with the exclusive use of time-multiplexing or a combination of time-multiplexing and code-multiplexing.

Conversion to carrier frequencies is also being discussed.

SUMMARY OF THE INVENTION

The present invention aims to use a transmission process with specific adaptive properties in an analog or mixed analog-digtal radio transmission system, having a fixed base station and a number of subscriber stations independent of one another.

According to the invention, information from the base station is transmitted to the subscriber stations wherein each information channel is converted by suppressed carrier, single-side band modulation to a narrow-band signal. The narrow-band signals are arranged spectrally adjacent one another in a frequency multiplex allocation scheme and are modulated on a carrier set at a higher frequency range using phase or frequency modulation. Each subscriber station accesses no more than one of the information channels. Information transmission from the subscriber stations to the base station is performed using narrow-band radio channels.

For a better understanding of the invention, reference is made to the following description taken in conjunction with the accompanying drawing, and the scope of the invention will be pointed out in the appended claims.

BRIEF DESCRIPTION OF THE DRAWINGS

In the drawing:

FIG. 5 is a block diagram of the present transmission system.

DETAILED DESCRIPTION OF THE INVENTION

The formation of information channels is performed in the present system such that no more than one duplex information channel per subscriber station is prepared as needed, resulting in an economical construction by adapting to the average traffic encountered. Both the base station and the subscriber stations can be manufactured very cost-effectively.

The possibility of the transmission of signals from the base station to the subscribers is to be provided, with limitations in some cases in the opposite direction.

Figure 1:
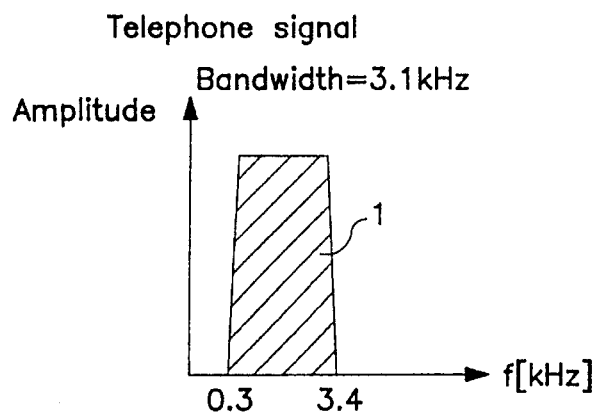
FIG. 1 is a frequency spectrum of a telephone signal being transmitted.
Figure 2:
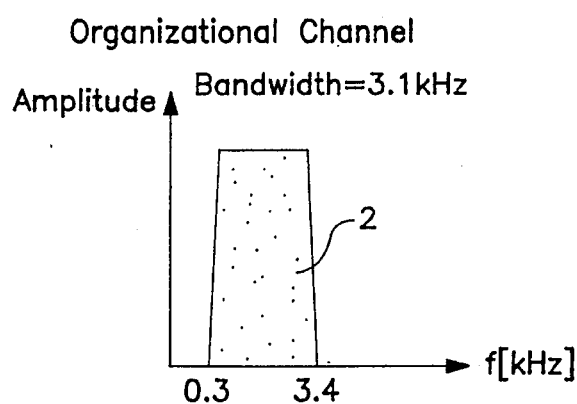
FIG. 2 a frequency spectrum of the an organization or management signal.
Figure 3:
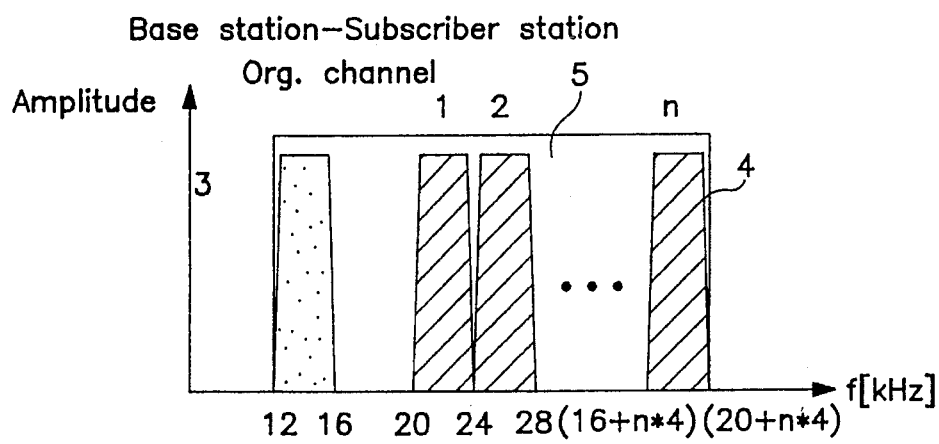
FIG. 3 a spectrum of the modulated signal for transmission from the base station to a subscriber station, FIG. 4 a frequency spectrum of an entire communications system according to the invention.
Figure 4:
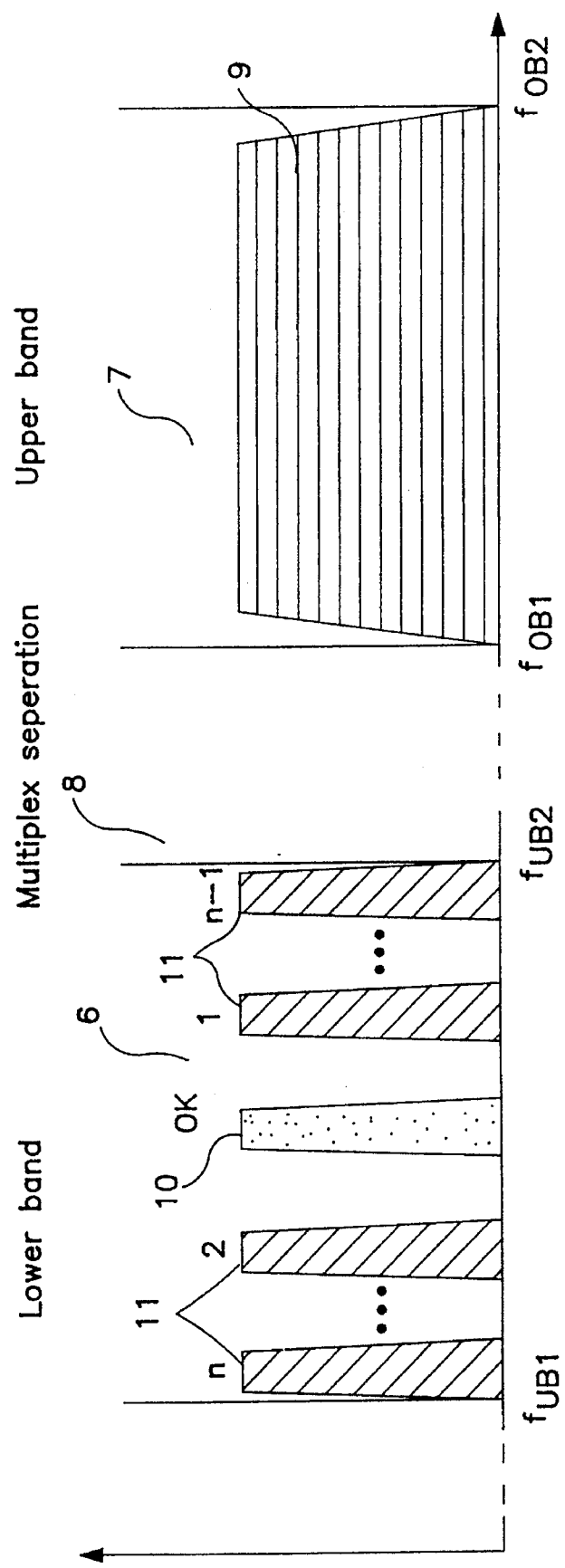

In accordance with the invention and referring to FIGS. 1–5, information is transmitted from a base station 20 to a number of independent subscriber stations 22 by converting each information (e.g., telephone) signal 1, using suppressed carrier single-side band modulation, to a narrow-band signal (see FIG. 3). As shown in FIGS. 3 and 4, the narrow-band signals are allocated in a frequency-multiplex scheme such that the frequency spectrums occupied by the signals are closely adjacent one another (FIG. 3). The frequency-multiplex signals are modulated on a carrier to a higher frequency range 7 using angle (phase or frequency) modulation, and each subscriber station accesses no more than one of the information channels, Information is transmitted from each subscriber station 22 to the base station 20 using narrow-band radio channels 6 (see FIG. 4).

The base station 20 has a capacity of n narrow-band information channels 1, one of which is shown in FIG. 1, to be used for the transmission of analog or digital information, e.g., for telephone traffic providing the possibility of responding.

In the base station these n-channels are prepared at the transmitting end such that they form a frequency-multiplex signal 3, 4, as shown in FIG. 3. This multiplex signal is preferably imposed upon a radiofrequency carrier 9 (FIG. 4) by angle modulation and radiated from an antenna in a broad-band radio channel 7.

In the direction of transmission from the subscriber station to the base station, the subscriber stations transmit in narrow-band channels 6 at different frequencies. By using angle modulation, it is possible here again to minimize the requirements of the radiofrequency components.

The transmission of signal and control commands is performed, depending on the size of the system, either by multiplexing in a normal information channel or in a special organization channel 2 (FIG. 2). In comparison with known processes, this method has the advantage that only in the processing of the multiplex signal in the NT (signal frequency) and TF (carrier frequency) plane of the transmitter of the base station is it necessary to make the greatest demands on the intermodulation levels of the components and on the stability of the signal processing. Extremely linear radiofrequency amplifiers or complex combination circuits requiring high power and occupying much space are avoided in this manner, as well as relatively expensive VHF or UHF synthesizers.

In the receivers of the subscriber stations there is also a shift in the requirements regarding stability under strong signals, linearity and high frequency stability in the radiofrequency section to the TF/NF plane.

The transmitters of the subscriber stations and the receiver in the base station are not different from the corresponding components in known radio transmission systems of this kind.

On account of the special electromagnetic wave propagation conditions in the radiofrequency range interference problems can occur due to multiple-path propagation, and they must be heeded especially in the case of great bandwidths and in mobile operation with relatively low effective antenna heights. Consequently, use is proposed substantially for not excessively great numbers of channels and fixed subscriber stations.

A radio transmission system of this kind can be made such, according to one embodiment of the invention, that the channel allocation schemes in the two direction of transmission are not identical, by providing that in the transmitter part of the base station 20 signal processing is performed as follows:

Each information channel 1 is put on a first modulator which produces a single-band signal 3, 4 (FIG. 3) which is set to a specific frequency within the NF (signal frequency) and TF (carrier frequency) range, respectively. The individual information channels then have a set frequency separation from one another (frequency allocation scheme) as shown in FIG. 3. They are then summed and form a frequency multiplex signal.

If the information channels are, for example, analog telephone channels with a bandwidth of 0.3 to 3.4 kHz 1 (see FIG. 1), then the resultant frequency-multiplex signal can be arranged with a 4 KHz channel interval beginning at, e.g., 40 kHz. For 60 channels a multiplex signal bandwidth of up to 280 kHz would be needed.

Such signals are known, for example, in carrier frequency technology, or as baseband signals in radio beam technology.

The process for the production of these signals can be assumed to be well known.

Special technical requirements exist in regard to the spectral purity of the multiplex signal by assuring very little interaction between the information channels. Intermodulation, undesirable mix products and noise limit the maximum possible number of channels and the attainable signal-to-noise ratio per channel, the limit varying with the cost and complexity of the circuitry.

The multiplex signal thus prepared is fed to a phase modulator or frequency modulator so that a radiofrequency carrier is given a wide-band modulation in comparison to the individual information channel 9. Then the signal can be amplified to the required transmission power in a not necessarily linear output stage and radiated from an antenna. The transmitted signal 9 occupies at least twice the bandwidth of the multiplex signal. See FIG. 4. Transmitter power and the occupied radiofrequency band width can be exchanged with one another depending on the given signal-to-noise ratio through the modulation index that is to be selected.

Any kind of process heretofore known requires relatively expensive VHF or UHF synthesizers as well as one radio frequency (RF) amplifier per information channel, with the formation of the multiplex signal by bulky, expensive combination circuits requiring a substantially greater RF power per channel, or else one antenna per channel.

Common to both processes is that the possible number of information channels is relatively small.

In the receiver of the subscriber station 22, the RF part needs to satisfy relatively low requirements as regards linearity and frequency stability. These requirements need to be considered only in the case of signal demodulation and the selection/demodulation of the desired information channel in the TF and NF planes.

If the amount of traffic per subscriber is limited in time, a substantially greater number of subscribers can be served with this kind of radio transmission system than there are information channels available (directional transmission, multiple access).

According to the invention, in the present radio transmission system, a digital organization channel 2 (FIG. 2) is present in the multiplex signal for signaling and management or organization purposes internal to the system, and for the defining the structure of connections or links between the base station 20 and the subscriber stations 22. The organization channel is produced in a time-multiplex manner. Another digital organization channel 10 is available for signaling from the subscriber stations 22 to the base station 20. All subscriber stations 22 may use the organization channel 10 as an independent channel in time-multiplex random access. The organization channels 2, 10 for the two directions of transmission need not be incorporated identically into the channel scheme.

Thus, a digital organization or service channel 2 (FIG. 2) in the direction from the base station to the subscriber stations is proposed for the necessary organizational, signaling and control processes in the system. This organization channel is fed by a process control unit and can be received by the subscriber apparatus, so that signaling at the start of an information transmission, frequency assignments of free information channels, system-internal reports etc. can be made available to the subscribers.

The organization channel 2 (FIG. 2) in that case is locked into the frequency-multiplex signal of the base station that is separate in frequency from the information channels (see FIG. 3), and transmitted after RF modulation in a frequency band common with the information channels see FIG. 4, In the subscriber telephones the organization channel is available after signal demodulation.

In the direction from the subscriber stations to the base station, the communication of organization information takes place in an independent narrow-band radio channel 10 (FIG. 4) which can have the same parameters as an information channel.

To prevent collision between transmissions from different subscriber stations on the subscriber organization channel, the individual subscriber stations preferably operate in a time-muliplex manner.

In one embodiment of the present system, the base station organization channel (i.e., in the transmission direction from the base station 20 to the subscriber stations 22) is a channel of lowest frequency among the channel frequencies 7 transmitted by the base station, and the subscriber station organization channel (in the transmission direction from the subscriber station 22 to the base stations 20) is at a middle portion of the frequency band allotted all of the subscriber stations 22. See FIG. 4. This may be accomplished in the following way.

A pilot signal can be inserted into the multiplex signal of the base station transmitter. This pilot signal can serve for various control purposes in the subscriber stations, such as signal-to-noise ratio, and/or as a control signal for the timing and timing correction, as well as retuning the frequency of the subscriber stations. In this manner a simple synchronization of the entire system is possible. For another thing, the cost involved in achieving the required stability of the frequency processing in the subscriber stations 22 is substantially reduced, since locking onto a highly stable calibration source in the base station 20 can be performed. In one embodiment, a generator at the base station 20 produces a pilot signal that is integrated into the multiplex base station signal, and the subscriber stations 22 use the pilot signal for control purposes, or for obtaining timing detection, timing correction, and retuning of the subscriber station frequencies.

The receiver sections of the subscriber stations are thus advantageously designed so that a demultiplexer follows the demodulator for the wide-band received signal. This demultiplexer makes the organization channel permanently available at its output. Furthermore, the pilot signal and, if required, an information channel is made ready at other outputs.

Such an arrangement permits receiving signals and commands parallel with the actual information transmission and thus can effectively improve the quality of the system, e.g., for changing frequency in the case of trouble in radio channels, for transmitting additional information, for synchronization purposes etc. The circuitry is comparatively inexpensive, so that only an RF input section and a demodulator are still required for the entire receiver. Parallel processing is performed only following the demultiplexer on the NF/TF plane. It is contemplated that in the present radio transmission system, the subscriber stations 22 will have receivers for demodulating the wide-band base station signal, and a de-multiplexer which produces at its output a data signal carried by the organization channel for signaling and control purposes, a freely selectable information channel, and the mentioned pilot signal from the base station. Such a subscriber receiver can also be used for the data signal of the permanently received organization channel for purposes of timing detection, timing correction, and for retuning the frequency of the subscriber stations. What is required for this is a highly stable data timing in the organization channel with an appropriate coding, the extraction of appropriate spectral lines serving as control data for the frequency processing of the subscriber stations.

Furthermore, it is contemplated that in the present radio transmission system the subscriber stations 22 will use the data signal from the organization channel for timing detection, timing correction, and for retuning of the subscriber station frequencies. Also, the base station 20 and the subscriber stations 22 may be coupled with information sources or sinks via radio or wire.

Accordingly, neither the base station nor the subscriber stations have to be direct information sources or information sinks. The base station can be, for example, connected to the public telephone network via cables or directly coupled to an exchange. The subscriber stations can act, for example, as private branch exchanges or as a terminal for subscriber end apparatus.

Likewise, transfers to other public or nonpublic radio or cable networks are possible.

The necessary information exchange, organization procedures, control and signaling procedures can then be performed by a special process control unit.

What is claimed is:

1. A method of communicating information in a radio transmission system including a base station and a number of independent subscriber stations, comprising:

converting first information signals to be communicated from the base station to the subscriber stations to narrow-band signals using single-side band suppressed carrier modulation;

setting frequency band limits for each of said narrow-band signals to allow said narrow band signals to form a combined, frequency-multiplex signal;

modulating said frequency multiplex signal on a carrier using phase or frequency modulation to produce a wide band radio signal containing the first information signals to be communicated from the base station to said subscriber stations;

accessing, at each subscriber station, no more than one of said first information signals; and communicating second information signals from each subscriber station to said base station by transmitting the second information signals within corresponding narrow-band channels.

2. The method of claim 1, including allocating different radio frequency bands for said wide band radio signal and for said narrow-band radio channels.

3. The method of claim 1, including transmitting a first digital organization channel from the base station to the subscriber stations for internal system signaling and management purposes and for structuring links between the base and the subscriber stations, forming the organization channel in a time-multiplex format and placing the organization channel as part of the combined, frequency-multiplex signal at the base station;

providing a second digital organization channel for signaling from the subscriber stations to the base station such that each subscriber station can randomly access the second organization channel according to a time-multiplex scheme; and allocating the first and the second organization channels at different radio frequencies.

4. The method of claim 3, including allocating said second organization channel as lowest frequency channel among said narrow band radio channels, and allocating said first organization channel at a center frequency within said wide band radio signal.

5. The method of claim 1, including generating a pilot signal at said base station and integrating the pilot signal into said frequency-multiplex signal, and using the pilot signal at the subscriber stations for at least one of controlling station functions, detecting timing, correcting timing, and retuning the frequencies of the subscriber stations.

6. The method of claim 5, including demodulating the wide-band signal at the subscriber stations using a receiver and a demultiplexer, and producing at an output of the demultiplexer a data signal corresponding to said first organization channel for (a) signaling and controlling subscriber station functions, (b) selecting an information channel, and (c) providing said pilot signal.

7. The method of claim 6, including using the data signal at the subscriber stations for detecting timing, correcting timing, and for retuning the frequencies of the subscriber stations.

8. The method of claim 1, including connecting with information sources or sinks at the base and the subscriber stations by radio or by wire.

* * * * *